(12) United States Patent
Eliash et al.

(10) Patent No.: US 12,585,388 B2
(45) Date of Patent: Mar. 24, 2026

(54) SELECTIVELY ENABLING VALLEY TRACK FOR READING DATA

(71) Applicant: Micron Technology, Inc., Boise, ID (US)

(72) Inventors: Tomer Eliash, Sunnyvale, CA (US); Jianmin Huang, San Carlos, CA (US); Zhengang Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/741,219

(22) Filed: Jun. 12, 2024

(65) Prior Publication Data

US 2024/0419332 A1 Dec. 19, 2024

Related U.S. Application Data

(60) Provisional application No. 63/472,723, filed on Jun. 13, 2023.

(51) Int. Cl.
G06F 12/00 (2006.01)
G06F 3/06 (2006.01)

(52) U.S. Cl.
CPC .......... G06F 3/0613 (2013.01); G06F 3/0659 (2013.01); G06F 3/0679 (2013.01)

(58) Field of Classification Search
CPC ..... G06F 3/0625; G06F 3/0659; G06F 3/0673
USPC ........................................................ 711/154
See application file for complete search history.

(56) References Cited

U.S. PATENT DOCUMENTS

| | | | |
|---|---|---|---|
| 2014/0229131 A1* | 8/2014 | Cohen ................ | G11C 16/3418 |
| | | | 702/64 |
| 2016/0092301 A1* | 3/2016 | Ish-Shalom ........... | H03M 13/45 |
| | | | 714/764 |
| 2017/0271031 A1* | 9/2017 | Sharon .................... | G11C 29/52 |
| 2019/0130967 A1* | 5/2019 | Danjean .............. | G11C 11/5642 |
| 2019/0198097 A1* | 6/2019 | Kim ........................ | G11C 16/34 |

(Continued)

FOREIGN PATENT DOCUMENTS

WO 2024258978 12/2024

OTHER PUBLICATIONS

"International Application Serial No. PCT US2024 033628, International Search Report mailed Sep. 24, 2024", 3 pgs.

(Continued)

*Primary Examiner* — Mohamed M Gebril
(74) *Attorney, Agent, or Firm* — Schwegman Lundberg & Woessner, P.A.

(57) ABSTRACT

Aspects of the present disclosure configure a memory subsystem controller to read data from a first portion of a memory based on read levels previously established while reading a second portion of the memory. The controller receives a request to read data from a first portion of a set of memory components. The controller identifies a second portion of the set of memory components that has been programmed with data within a threshold period of time of programming the data in the first portion. The controller retrieves a set of read threshold levels that have been previously computed in association with reading the data from the second portion. The controller reads the data from the first portion using the set of read threshold levels that have been previously computed in association with reading the data from the second portion.

20 Claims, 7 Drawing Sheets

(56) References Cited

U.S. PATENT DOCUMENTS

| 2020/0066353 | A1* | 2/2020 | Pletka | G06F 3/0604 |
| 2021/0193231 | A1* | 6/2021 | Luo | G06F 3/0659 |
| 2022/0319630 | A1* | 10/2022 | Sheperek | G11C 29/021 |
| 2024/0419332 | A1* | 12/2024 | Eliash | G06F 3/0613 |

OTHER PUBLICATIONS

"International Application Serial No. PCT US2024 033628, Written Opinion mailed Sep. 24, 2024", 4 pgs.

* cited by examiner

400

410 / 412 / 414

| Group | Blocks |
|---|---|
| 1 | A, C, I |
| 2 | B |
| 3 | D, H |
| 4 | G |
| 5 | F |

420 / 422 / 424

| | SL1 | SL2 | SL3 | SL4 | SL5 | SL6 | SL7 |
|---|---|---|---|---|---|---|---|
| TH1 | +12mV | -12mV | +12mV | +24mV | 0 | -24mV | -36mV |
| TH2 | 0 | -12mV | -24mV | 0 | 0 | 0 | -24mV |
| TH3 | 0 | 0 | 0 | 0 | 0 | 0 | -24mV |
| TH4 | -12mV | 0 | +12mV | +12mV | +12mV | 0 | -12mV |
| TH5 | -12mV | -12mV | -12mV | -12mV | -12mV | -12mV | -12mV |
| TH6 | 0 | 0 | 0 | 0 | 0 | 0 | 0 |
| TH7 | 0 | 0 | 0 | 0 | 0 | 0 | 0 |

440 / 442

| Group | Blocks |
|---|---|
| 1 | A, C, I |
| 2 | B |
| 3 | D, H |
| 4 | G |
| 5 | F |

430 / 432 / 434

| | SL1 | SL2 | SL3 | SL4 | SL5 | SL6 | SL7 |
|---|---|---|---|---|---|---|---|
| TH1 | +12mV 0V | -12mV | +12mV 0V | +24mV +12mV | 0 | -24mV | -36mV |
| TH2 | 0 | -12mV | -24mV | 0 | 0 | 0 | -24mV |
| TH3 | 0 | 0 | 0 | 0 | 0 | 0 | -24mV |
| TH4 | -12mV | 0 | +12mV | +12mV | +12mV | 0 | -12mV |
| TH5 | -12mV | -12mV | -12mV | -12mV | -12mV | -12mV | -12mV |
| TH6 | 0 | 0 | 0 | 0 | 0 | 0 | 0 |
| TH7 | 0 | 0 | 0 | 0 | 0 | 0 | 0 |

| | WL0 - WL90 | WL91-WL100 | WL101-WL130 | WL131-WL223 |
|---|---|---|---|---|
| SL1 | 0 | -10mV | 0 | +20mV |
| SL2 | 0 | -10mV | 0 | 0 |
| SL3 | 0 | 0 | 0 | -10mV |
| SL4 | +30mV | 0 | 0 | -10mV |
| SL5 | +20mV | -10mV | 0 | -10mV |
| SL6 | 0 | 0 | 0 | +10mV |
| SL7 | 0 | 0 | 0 | 0 |

*FIG. 5*

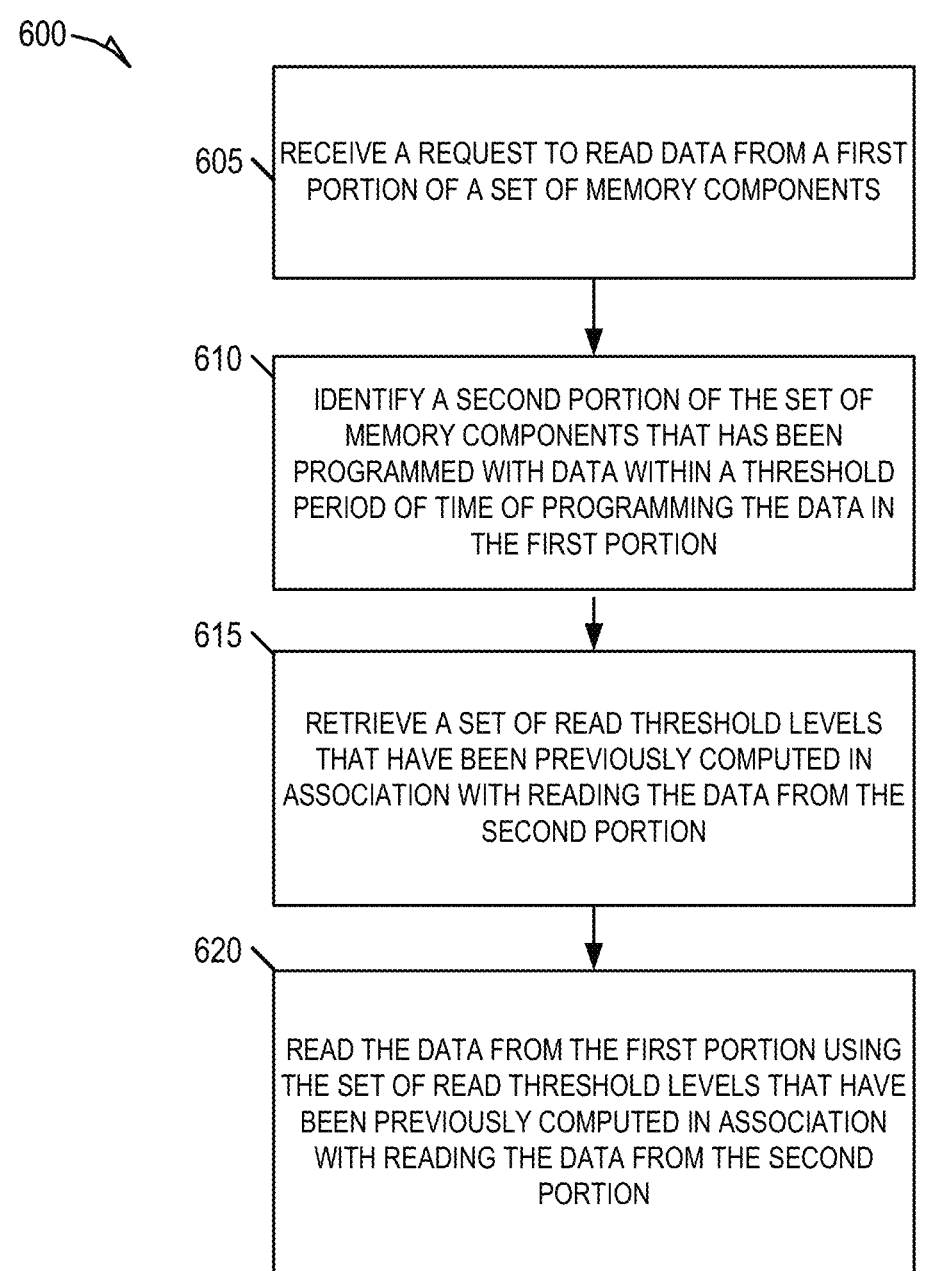

600

605 RECEIVE A REQUEST TO READ DATA FROM A FIRST PORTION OF A SET OF MEMORY COMPONENTS

610 IDENTIFY A SECOND PORTION OF THE SET OF MEMORY COMPONENTS THAT HAS BEEN PROGRAMMED WITH DATA WITHIN A THRESHOLD PERIOD OF TIME OF PROGRAMMING THE DATA IN THE FIRST PORTION

615 RETRIEVE A SET OF READ THRESHOLD LEVELS THAT HAVE BEEN PREVIOUSLY COMPUTED IN ASSOCIATION WITH READING THE DATA FROM THE SECOND PORTION

620 READ THE DATA FROM THE FIRST PORTION USING THE SET OF READ THRESHOLD LEVELS THAT HAVE BEEN PREVIOUSLY COMPUTED IN ASSOCIATION WITH READING THE DATA FROM THE SECOND PORTION

*FIG. 6*

SELECTIVELY ENABLING VALLEY TRACK FOR READING DATA

PRIORITY APPLICATION

This application claims the benefit of priority to U.S. Provisional Application Ser. No. 63/472,723, filed Jun. 13, 2023, which is incorporated herein by reference in its entirety.

TECHNICAL FIELD

This disclosure relates generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIGS. 4 and 5 are block diagrams of examples of tables used to select read threshold voltages for reading data from portions of a memory component, in accordance with some examples.

FIG. 6 is a flow diagram of an example method to selectively compute a read threshold voltage for certain portions of a memory component, in accordance with some examples.

DETAILED DESCRIPTION

Figure 1:
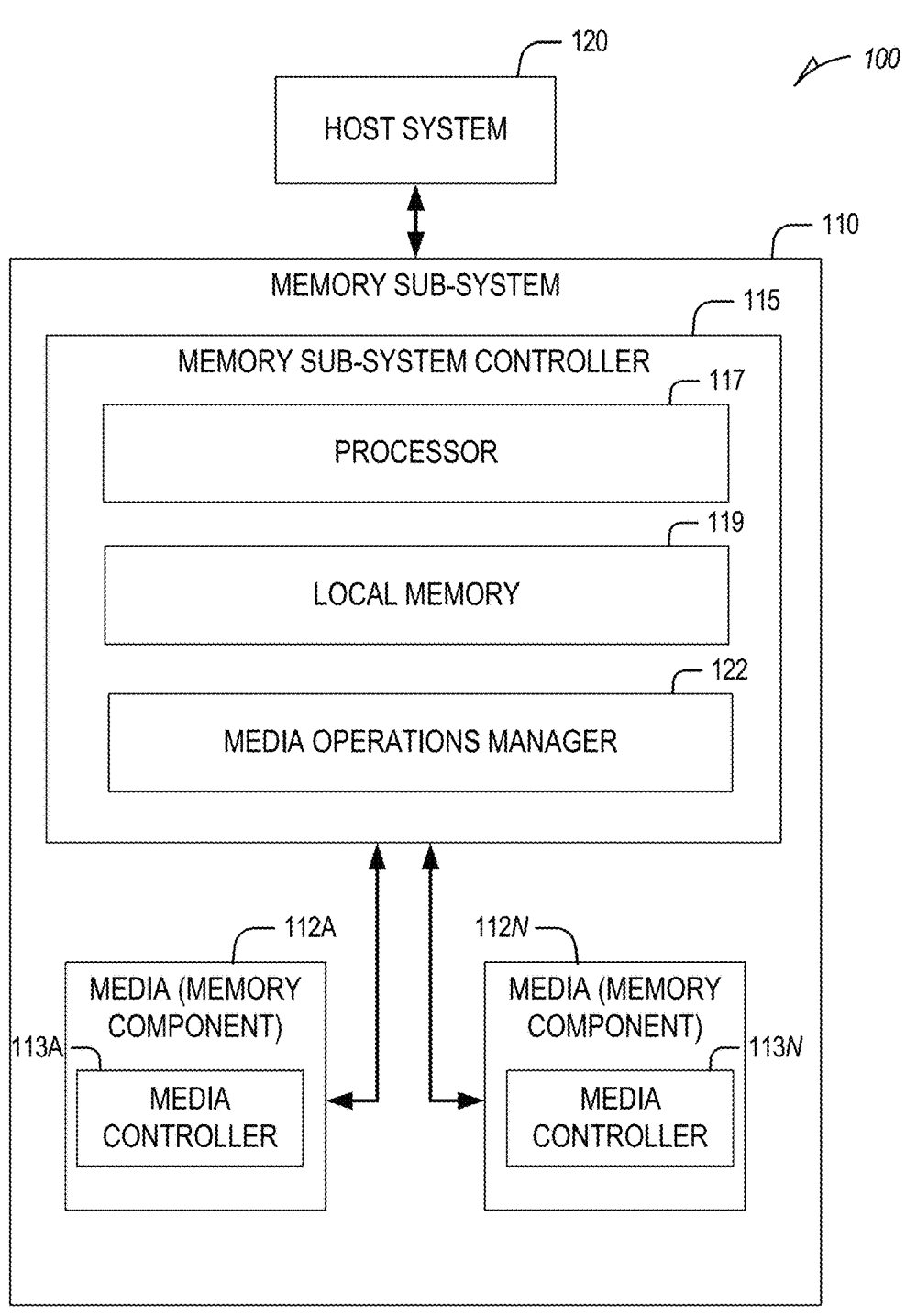
FIG. 1 is a block diagram illustrating an example computing environment including a memory sub-system, in accordance with some examples.

Aspects of the present disclosure configure a system component, such as a memory sub-system controller, to read data from a first portion of a memory sub-system using read threshold voltages established while reading data from a second portion of the memory sub-system. The memory sub-system controller can identify groups, zones, regions, portions, or segments of a memory component or multiple memory components (generally referred to, collectively or individually, as a portion of a set of memory components) that have been programmed within a same period of time and/or within a same temperature range. The memory sub-system controller can compute or generate a set of read threshold voltages for reading data from a first of the identified groups, zones, regions, portions, or segments of the memory component. The memory sub-system controller can then use the previously computed/generated set of read threshold voltages to subsequently read data from a second of the identified groups, zones, regions, portions, or segments of the memory component, such as without recomputing or regenerating the set of read threshold voltages. This ensures that performance of the memory system remains optimal by only performing complex read threshold voltage computation operations (e.g., valley track operations) to determine read threshold voltages for certain portions of the memory components and applying those precomputed read threshold voltages to reading other portions. This improves the overall efficiency of operating the memory sub-system and reduces memory resource consumption.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. In some examples, firmware of the memory sub-system may re-write previously written host data from a location on a memory device to a new location as part of garbage collection management operations. The data that is re-written as part of garbage collection or folding operations, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area that can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Certain memory systems control the read threshold voltage that is used to read data from the memory components and/or individual WLs of the memory components based on a program temperature and/or other criteria (e.g., read bit error rate (RBER)). For example, when reading data from the memory components, the memory controller can access a predetermined read threshold voltage associated with the level and/or block from which the data is being read. Using that predetermined read threshold, the memory controller can then read the data from the block. In some cases, the predetermined threshold voltage results in a larger than expected RBER. To reduce the number of errors resulting from read operations, certain memory controllers apply a read threshold computation process or method, such as a valley track process, to compute more accurate read threshold voltages. The valley track process involves sampling the data from the cell of the memory block at multiple nearby read threshold voltages. The valley track process takes a great deal of time which degrades performance of the memory sub-system.

These read threshold voltages, determined using the valley track process, can be selected relative to the predetermined read threshold voltage. The read threshold voltage that results in the smallest RBER can be selected and associated with that memory component for reading the data. When a subsequent read operations is received for the same or another block that may be physically adjacent to the previously read block, the memory controller can again perform the valley track process to compute/determine the optimal read threshold voltage. While this generally works to read data with a low RBER, the need to reperform the valley track operations each time data is read from a given portion of the memory is incredibly inefficient and wastes a great deal of time as the valley track process takes time and degrades performance. This reduces the overall capabilities and quality of the memory sub-system beyond what may be needed and creates significant inefficiencies and wastes resources.

Aspects of the present disclosure address the above and other deficiencies by providing a memory controller that can selectively perform the valley track process for certain memory component portions and not others. This can be selectively performed based on how physically close the portions of the memory components are and/or based on whether data was written to such portions within some same period of time and/or within a same range of temperatures. Namely, the memory controller can perform valley track operations to update read threshold voltage values associated with one portion of the memory component and use those updated read threshold voltage values to read another portion of the memory component without having to reperform the valley track operations. In this way, by only performing the valley track operations sometimes and not for reading data from all portions of the memory components, the performance of the memory sub-system can remain near optimal and the memory sub-system can continue operating in an efficient manner. This keeps the memory sub-system operating as expected and specified by the quality and manufacturing standards. Specifically, by determining that the next page to read received the same characteristics as one previously read and placed in a table, the valley track operations can be turned OFF for reading the next page which improves performance and avoids having to waste time performing valley track operations. The memory controller can use the read threshold values determined previously for the previously read page to read the next page. In some examples, when the read temperature is different from the write temperature associated with a given portion of the memory sub-system, the controller may recalculate the read thresholds.

In some examples, the memory controller receives a request to read data from a first portion of the set of memory components. The memory controller identifies a second portion of the set of memory components that has been programmed with data within a threshold period of time of programming the data in the first portion. The memory controller retrieves a set of read threshold levels that have been previously computed in association with reading the data from the second portion. The memory controller reads the data from the first portion using the set of read threshold levels that have been previously computed in association with reading the data from the second portion. In some examples, the first portion includes a first block of an individual memory component and the second portion includes a second block of the individual memory component.

In some examples, the memory controller determines that the second portion is within a threshold physical proximity to the first portion of the set of memory components. The set of read threshold levels is retrieved in response to determining that the second portion is within the threshold physical proximity to the first portion. In some examples, the memory controller receives a previous request to read the data from the second portion of the set of memory components. The memory controller applies a valley track process to compute the set of read threshold levels to read the data from the second portion.

In some examples, the valley track process computes the set of read threshold levels by performing operations including accessing a predetermined read threshold voltage. The valley track process samples data at different read threshold voltages relative to the predetermined read threshold voltage and selects one or more threshold voltages from the different read threshold voltages based on an error rate associated with the sampled data. In some examples, the memory controller stores a table that maps a plurality of portions of the set of memory components to respective sets of read threshold voltages based on relative program times of the plurality of portions. A first set of portions of the set of memory components includes a first plurality of portions of the set of memory components that have each been programmed within a first time period, and a second set of portions of the set of memory components includes a second plurality of portions of the set of memory components that have each been programmed within a second time period.

In some examples, the memory controller associates the first set of portions with a first set of read threshold voltages and associates the second set of portions with a second set of read threshold voltages. In some examples, the memory controller updates one or more values in the first set of read threshold voltages in response to receiving a request to read data from an individual portion of the first set of portions. In some examples, the memory controller groups the first set of portions of the set of memory components according to a temperature of the memory sub-system when data was written to each portion of the first set of portions. In some examples, the memory controller associates a first group of the first set of portions with a first set of read threshold voltages. The first group includes a first subset of the first plurality of portions programmed when the temperature of the memory sub-system was within a first temperature range. The memory controller associates a second group of the first set of portions with a second set of read threshold voltages. The second group includes a second subset of the first plurality of portions programmed when the temperature of the memory sub-system was within a second temperature range.

In some examples, the memory controller determines that the temperature of the memory sub-system has shifted from a first temperature range to a second temperature range during programming of data in a first subset of the first plurality of portions. The memory controller, in response to determining that the temperature of the memory sub-system has shifted from the first temperature range to the second temperature range during programming of the data in the first subset of the first plurality of portions, folds the data into a new portion of the set of memory components. In some examples, the memory controller identifies an individual portion of the plurality of portions in the table that has been programmed within a threshold period of time of when the data has been folded to the new portion. The memory controller groups the new portion with the individual portion in the table to associate the new portion and the individual portion with a same set of read threshold voltages.

In some examples, the memory controller groups word lines (WLs) of the first set of portions of the set of memory components into different word line groups (WLGs). In some examples, the memory controller associates a first WLG of the different WLGs of the first set of portions of the set of memory components with a first set of read threshold voltages. The memory controller associates a second WLG of the different WLGs of the first set of portions of the set of memory components with a second set of read threshold voltages. In some examples, the memory controller determines a RBER associated with the data read from the first portion. The memory controller determines that the RBER associated with the data read from the first portion transgresses a threshold RBER. The memory controller, in response to determining that the RBER associated with the data read from the first portion transgresses the threshold RBER, updates the set of read threshold levels to re-read the data from the first portion.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, the first memory component 112A including (a word line (WL), a word line group (WLG), a block, portion or page of the first memory component 112A), or group of memory components including the first memory component 112A can be associated with a first reliability (capability) grade, value, measure, or lifetime PEC. The terms "reliability grade," "value" and "measure" are used interchangeably throughout and can have the same meaning. The second memory component 112N (a WL, a WLG, a block, portion, or page of the second memory component 112N) or group of memory components including the second memory component 112N can be associated with a second reliability (capability) grade, value, measure, or lifetime PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different groups, bins, or sets of the memory components 112A to 112N to respective reliability grades, lifetime PEC values, read threshold voltages, program (write) temperatures, and/ or current PEC values.

In some examples, a memory or register can be associated with all of the memory components 112A to 112N and can store a table that maps a first set of portions of the memory components 112A to 112N that have been programmed within a same first threshold time period (and/or at a same range of temperatures and/or are within a first threshold physical proximity to each other) with a first set of read threshold voltages and a second set of portions of the memory components 112A to 112N that have been programmed within a same second threshold time period (and/ or at a same range of temperatures and/or are within a second threshold physical proximity to each other) with a second set of read threshold voltages. The media operations manager 122 can update the first set of read threshold voltages according to a valley track process in response to reading data from one of the portions of the first set of portions of the memory components 112A to 112N. The media operations manager 122 can then apply that previously updated first set of read threshold voltages to subsequently read data from another portion of the first set of portions of the memory components 112A to 112N. In this way, using the table, the media operations manager 122 can dynamically and selectively turn on or enable performing valley track operations for reading data from some portions of the memory components 112A to 112N and not others on the basis of whether those portions were programmed at around the same period of time and/or are within a threshold physical proximity to each other. This can thereby maintain the efficiency of operating the memory sub-system at an optimal level.

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, and a Universal Flash Storage (UFS) drive. Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory and/or a 3D NAND flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime PEC values and/or reliability grades associated with different groups of the memory components 112N to 112N and/or different WLs, WLGs, and/or blocks within each of the memory components 112N to 112N.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively perform the valley track process for certain memory component portions and not others. The valley track process can be selectively performed based on how physically close the portions of the memory components are and/or based on whether data was written to such portions within some same period of time and/or whether data was written to such portions within a same range of temperatures. Namely, the media operations manager 122 can perform valley track operations to update read threshold voltage values associated with one portion of the memory component and use those updated read threshold voltage values to read another portion of the memory component without having to reperform the valley track operations. In this way, by only performing the valley track operations sometimes and not for reading data from all portions of the memory components, the performance of the memory sub-system 110 can remain near optimal and the memory sub-system 110 can continue operating in an efficient manner. This keeps the memory sub-system 110 operating as expected and specified by the quality and manufacturing standards.

In some examples, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
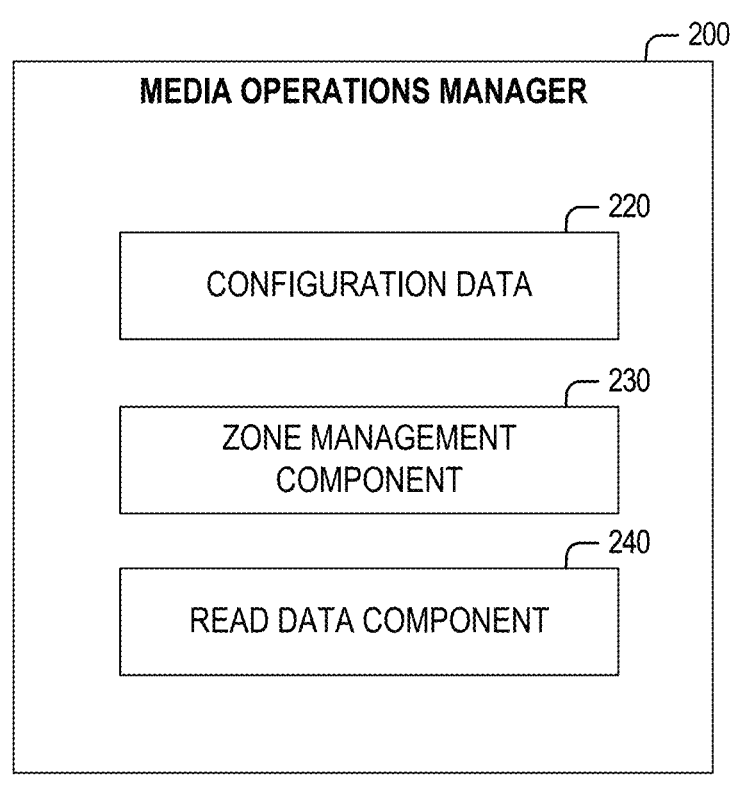
FIG. 2 is a block diagram of an example media operations manager, in accordance with some examples.

FIG. 2 is a block diagram of an example media operations manager 200 (corresponding to media operations manager 122), in accordance with some implementations of the present disclosure. As illustrated, the media operations manager 200 includes configuration data 220, a zone management component 230, and a read data component 240. For some cases, the media operations manager 200 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 200. For example, the media operations manager 200 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including read threshold voltages of different WLs, WLGs, bins, groups, blocks, block stripes, memory dies and/or sets of the memory components 112A to 112N. The media operations manager 122 receives configuration data from the host system 120 and stores the configuration data in the configuration data 220.

Figure 3:
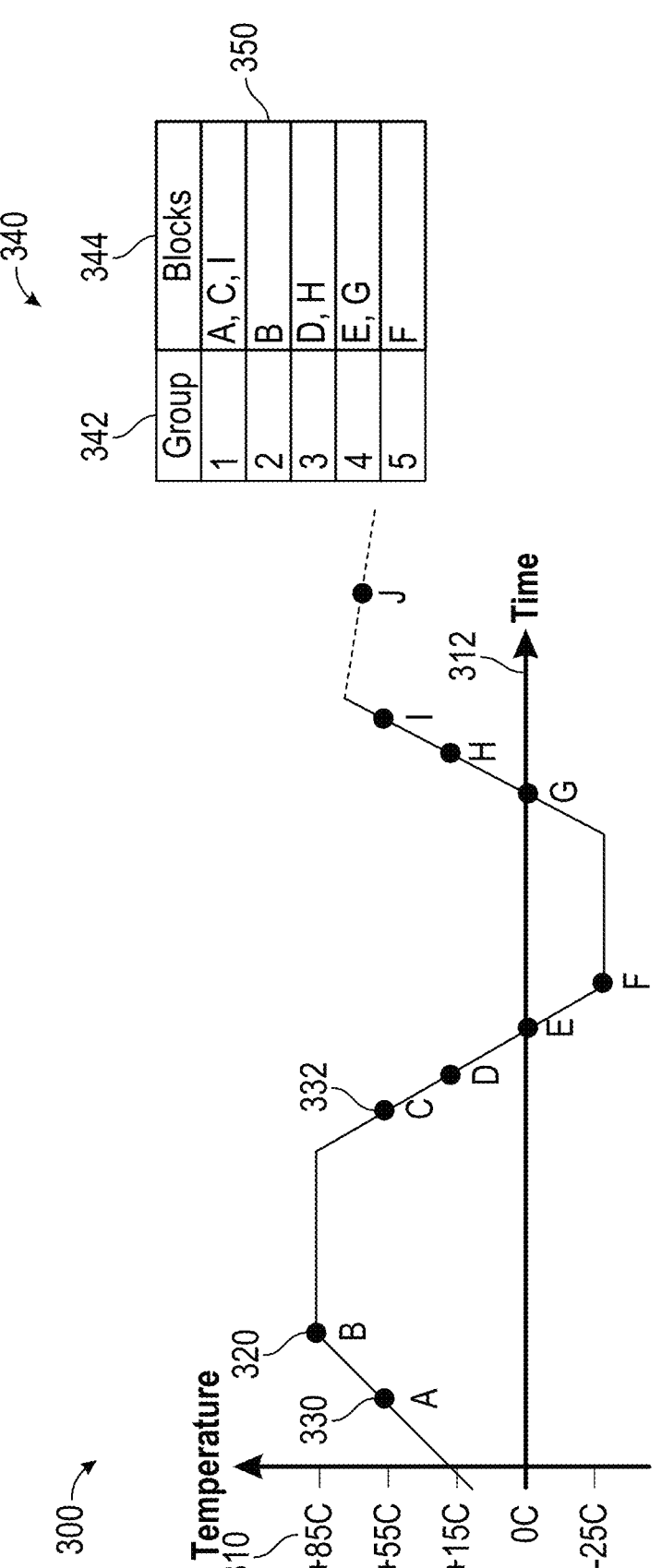
FIG. 3 is a block diagram of example groups of portions of memory components of the memory sub-system, in accordance with some examples.

The configuration data 220 can store a table that maps a first set of portions of the memory components 112A to 112N that have been programmed within a same first threshold time period (and/or at a same range of temperatures and/or are within a first threshold physical proximity to each other) with a first set of read threshold voltages and a second set of portions of the memory components 112A to 112N that have been programmed within a same second threshold time period (and/or at a same range of temperatures and/or are within a second threshold physical proximity to each other) with a second set of read threshold voltages. For example, as shown in the timing diagram 300 of FIG. 3, a table 340 can be generated and stored as part of the configuration data 220 based on the temperature ranges of the memory sub-system 110 when data is programmed to different portions of the memory sub-system 110. In some cases, the table 340 can store the write temperature associated with each of the different portions of the memory sub-system 110. The media operations manager 200 can determine a read temperature associated with the memory sub-system 110 when a read request is received. If the read temperature (e.g., the current temperature) of the portion of the memory sub-system 110 is different from the write temperature stored in the table for the same portion being read, such as by more than a threshold amount, the media operations manager 200 can perform valley track operations to update read values stored in the configuration data 220 for the portion being read. These values can then be used to read a second portion (which may be adjacent or in the same group) as the previously updated portion without having to re-perform the valley track operations for the second portion.

Specifically, the table 340 can include a list of groups 342 along with indications of the portions 344 (e.g., blocks) within each group. In some examples, the timing diagram 300 shows a set of different temperatures 310 across which data is programmed to different portions of the memory components 112A to 112N across an individual time period 312 (or multiple time periods). At a first point in time, data can first be programmed to a first portion of the memory components 112A to 112N, such as a first block 330 (block A) when the memory components 112A to 112N are operating at a first range of temperatures of the set of different temperatures 310. This first block 330 can be stored in association with a first group of the list of groups 342 in the table 340. At a second point in time (which can be within the individual time period 312), data can be programmed to a second portion of the memory components 112A to 112N, such as a second block 320 (block B) when the memory components 112A to 112N are operating at a second range of temperatures of the set of different temperatures 310. Because the memory components 112A to 112N were operating at the second range of temperatures, this second block 320 can be stored in association with a second group 350 of the list of groups 342 in the table 340. That is, even though the second block 320 was programmed close in time to the first block 330 and/or is physically proximate to the first block 330, because it was programmed at a different temperature range than the first block 330, the second block 320 is associated with a different group of the list of groups 342. This is because the different temperature ranges can correspond to different read threshold voltages being used to accurately read data from the blocks.

At a third point in time (which can be within the individual time period 312), data can be programmed to a third portion of the memory components 112A to 112N, such as a third block 332 (block C) when the memory components 112A to 112N are operating at the first range of temperatures of the set of different temperatures 310. In such cases, the third block 332 can be stored in association with the first group of the list of groups 342 in the table 340. Namely, the third block 332 can be grouped together with the first block 330 because both blocks were programmed at the same temperature ranges and were programmed within the individual time period 312 and/or are within a threshold physical proximity to each other. In some cases, an individual memory block (e.g., block J) can start to be programmed to the memory components 112A to 112N at a first temperature range and can end being programmed at a second temperature range. In such cases, the individual memory block cannot be associated with any of the groups in the table 340 when the individual memory finishes being programmed. Rather, the individual memory block can be folded into a new memory block when the temperature of the memory components 112A to 112N stabilizes. Then, the media operations manager 200 can determine the temperature range of the memory components 112A to 112N when the new memory block is storing the data from the individual memory block. If the new memory block is created or formed during the individual time period 312, the media operations manager 200 can group that new memory block with a respective group of the table 340 associated with the temperature range of the memory components 112A to 112N when the new memory block was generated. If the individual time period 312 has elapsed and a new time period has begun, the new memory block can be grouped with a different set of groups of the memory blocks associated with the new time period, as discussed below.

The configuration data 220 can continue monitoring the programming of the data across the individual time period 312 and can continue to update the table 340 based on the temperature ranges of the memory components 112A to 112N when the data is being programmed. As a result, the table 340 can group blocks of the memory components 112A to 112N based on their program temperatures and based on the fact that the blocks were programmed during the same individual time period 312. In some cases, after the individual time period 312 ends, the media operations manager 200 can generate a new instance of the table 340 that groups different blocks programmed at a new individual time period and based on the temperature ranges at which the blocks were programmed. In some cases, rather than creating a new instance of the table 340, the media operations manager 200 can add another column to the table 340 that identifies the time period during which the blocks were programmed. This additional column allows the media operations manager 200 to identify portions of the memory components 112A to 112N that were programmed during a same time interval for the purposes of retrieving the set of read threshold voltages associated with such portions.

As shown in the diagram 400 of FIG. 4, the configuration data 220 can store a table 410 of groups of memory portions (blocks) of the memory components 112A to 112N and respective read threshold voltages 420 for each group. Namely, a first group 412 can include a first set of memory portions of the memory components 112A to 112N that may have been programmed during the same time interval, are within a threshold physical proximity to each other, and/or have been programmed at a same temperature range as each other. The first group 412 can be associated with a first set of read threshold voltages 422. The first set of read threshold voltages 422 can define different read threshold voltage values for different levels of an MLC cell of the memory components 112A to 112N. A second group 414 can be associated with a second set of read threshold voltages 424. The second set of read threshold voltages 424 can define different read threshold voltage values for different levels of an MLC cell of the memory components 112A to 112N. The first set of read threshold voltages 422 can be the same in part or totally different from the second set of read threshold voltages 424.

The zone management component 230 can receive a request to read data from an individual portion of the memory components 112A to 112N. In response, the zone management component 230 can communicate with the configuration data 220 to determine which group or zone that individual portion belongs to. The zone management component 230 can determine whether a valley track process has been performed previously for reading data from the individual portion or was performed previously within a threshold period of time of when the request to read the data was received. In some cases, the zone management component 230 can instruct the read data component 240 to read the data from the individual portion according to a read threshold voltage stored in the threshold voltages 420 in association with the group that includes the individual portion of the memory components 112A to 112N. The zone management component 230 can determine the RBER associated with reading the data according to the read threshold voltage stored in the threshold voltages 420. In response to determining that the RBER is above an RBER threshold, the zone management component 230 can instruct the read data component 240 to perform a valley track process to determine a more accurate read threshold voltage for the individual portion.

For example, the zone management component 230 can receive a request to read the data from a first memory block 440. The first memory block 440 can be associated with the first set of read threshold voltages 422. The read data component 240 can update the first set of read threshold voltages 422 (e.g., for a first level 434 and for a second level 432) in response to performing the valley track process to generate an update instance 430 of the threshold voltages 420 including updated read threshold voltages at least for the first set of read threshold voltages 422. As shown in the update instance 430, the strikethroughs represent the previously stored read threshold voltages associated with the first group 412 that includes the first memory block first memory block 440 and the new read threshold voltages are shown next to the struck-out previous read threshold voltages.

After receiving the request to read the first memory block 440, the zone management component 230 can receive a request to read data from a second memory block 442. The second memory block 442 can be in the same group or zone as the first memory block 440. Namely, the second memory block 442 may have been written in the same time interval as the first memory block 440, can be within a threshold physical proximity of first memory block 440, and/or was written or programmed within the same temperature range as the first memory block 440. In response, the zone management component 230 can communicate with the configuration data 220 to obtain the update instance 430. The zone management component 230 can retrieve the read threshold voltages including those for the first level 434 and the second level 432 updated based on the previous application of the valley track process for reading the data from the first memory block 440. The zone management component 230 can then provide those read threshold voltages to the read data component 240 for reading data from the second memory block 442 without having to reperform the valley track process. If the zone management component 230 determines that the RBER resulting from reading data from the second memory block 442 transgresses a threshold RBER value, the read data component 240 can perform the valley track process to again update the read threshold voltages stored in association with the first group 412 that includes the first memory block 440 and the second memory block 442.

In some examples, the configuration data 220 can include another table that maps different WLs or WLGs to different sets of read threshold voltages. For example, as shown in FIG. 5, a table 500 lists a first set of WLs 510 and a second set of WLs 520. The first set of WLs 510 can be associated with a first set of read threshold voltages and the second set of WLs 520 can be associated with a second set of read threshold voltages. The table 500 can be updated in a similar manner as discussed above in relation to FIG. 4, based on an RBER and/or application of the valley track process for reading data from different portions of the memory components 112A to 112N. For example, in addition to considering the read threshold voltages stored in the update instance 430, the zone management component 230 can also access the table 500 to identify the read threshold voltages to apply to different WLs of the block associated with a given set of read threshold voltages. In some examples, data may be read by the read data component 240 from the first set of WLs 510 in response to a request to read data from the first memory block 440. The read threshold voltages stored in association with the first set of WLs 510 can be updated, such as in response to performing the valley track process. Then, at a later time after receiving the request to read the data from the first memory block 440, the data may be read by the read data component 240 from the first set of WLs 510 in response to a request to read data from the second memory block 442. The read threshold voltages, updated in association with the first set of WLs 510 in response to reading the data when the request to read the first memory block 440 was received, can be used to read the data from the first set of WLs 510 for the request to read the data from the second memory block 442.

FIG. 6 is a flow diagram of an example method 600 to selectively compute a read threshold voltage for certain portions of a memory component, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 6, the method (or process) 600 begins at operation 605, with a media operations manager 122 of a memory sub-system (e.g., memory sub-system 110) receiving a request to read data from a first portion of a set of memory components. Then, at operation 610, the media operations manager 122 of the memory sub-system identifies a second portion of the set of memory components that has been programmed with data within a threshold period of time of the data in the first portion. Thereafter, at operation 615, the media operations manager 122 retrieves a set of read threshold levels that have been determined for reading the data from the second portion. Then, at operation 620, the media operations manager 122 reads the data from the first portion using the set of read threshold levels that have been determined for reading the data from the second portion.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: receiving a request to read data from a first portion of a set of memory components; identifying a second portion of the set of memory components that has been programmed with data within a threshold period of time of programming the data in the first portion; retrieving a set of read threshold levels that have been previously computed in association with reading the data from the second portion; and reading the data from the first portion using the set of read threshold levels that have been previously computed in association with reading the data from the second portion.

Example 2. The system of Example 1, wherein the first portion comprises a first block of an individual memory component and the second portion comprises a second block of the individual memory component.

Example 3. The system of any one of Examples 1-2, the operations comprising: determining that the second portion is within a threshold physical proximity to the first portion of the set of memory components, wherein the set of read threshold levels is retrieved in response to determining that the second portion is within the threshold physical proximity to the first portion.

Example 4. The system of any one of Examples 1-3, the operations comprising: receiving a previous request to read the data from the second portion of the set of memory components; and applying a valley track process to compute the set of read threshold levels to read the data from the second portion.

Example 5. The system of Example 4, wherein the valley track process computes the set of read threshold levels by performing operations comprising: accessing a predetermined read threshold voltage; sampling data at different read threshold voltages relative to the predetermined read threshold voltage; and selecting one or more threshold voltages from the different read threshold voltages based on an error rate associated with the sampled data.

Example 6. The system of any one of Examples 1-5, the operations comprising: storing a table that maps a plurality of portions of the set of memory components to respective sets of read threshold voltages based on relative program times of the plurality of portions, wherein a first set of portions of the set of memory components comprises a first plurality of portions of the set of memory components that have each been programmed within a first time period, wherein a second set of portions of the set of memory components comprises a second plurality of portions of the set of memory components that have each been programmed within a second time period.

Example 7. The system of Example 6, the operations comprising: associating the first set of portions with a first set of read threshold voltages; and associating the second set of portions with a second set of read threshold voltages.

Example 8. The system of Example 7, the operations comprising: updating one or more values in the first set of read threshold voltages in response to receiving a request to read data from an individual portion of the first set of portions.

Example 9. The system of any one of Examples 7-8, the operations comprising: grouping the first set of portions of the set of memory components according to a temperature of the memory sub-system when data was written to each portion of the first set of portions.

Example 10. The system of Example 9, the operations comprising: associating a first group of the first set of portions with a first set of read threshold voltages, the first group comprising a first subset of the first plurality of portions programmed when the temperature of the memory sub-system was within a first temperature range; and associating a second group of the first set of portions with a second set of read threshold voltages, the second group comprising a second subset of the first plurality of portions programmed when the temperature of the memory sub-system was within a second temperature range.

Example 11. The system of any one of Examples 9-10, the operations comprising: determining that the temperature of the memory sub-system has shifted from a first temperature range to a second temperature range during programming of data in a first subset of the first plurality of portions; and in response to determining that the temperature of the memory sub-system has shifted from the first temperature range to the second temperature range during programming of the data in the first subset of the first plurality of portions, folding the data into a new portion of the set of memory components.

Example 12. The system of Example 11, the operations comprising: identifying an individual portion of the plurality of portions in the table that has been programmed within a threshold period of time of when the data has been folded to the new portion; and grouping the new portion with the individual portion in the table to associate the new portion and the individual portion with a same set of read threshold voltages.

Example 13. The system of any one of Examples 7-12, the operations comprising: grouping word lines (WLs) of the first set of portions of the set of memory components into different word line groups (WLGs).

Example 14. The system of Example 13, the operations comprising: associating a first WLG of the different WLGs of the first set of portions of the set of memory components with a first set of read threshold voltages; and associating a second WLG of the different WLGs of the first set of portions of the set of memory components with a second set of read threshold voltages.

Example 15. The system of any one of Examples 1-14, the operations comprising: determining a read bit error rate (RBER) associated with the data read from the first portion; determining that the RBER associated with the data read from the first portion transgresses a threshold RBER; and in response to determining that the RBER associated with the data read from the first portion transgresses the threshold RBER, updating the set of read threshold levels to re-read the data from the first portion.

Methods and computer-readable storage medium with instructions for performing any one of the above Examples.

Figure 7:
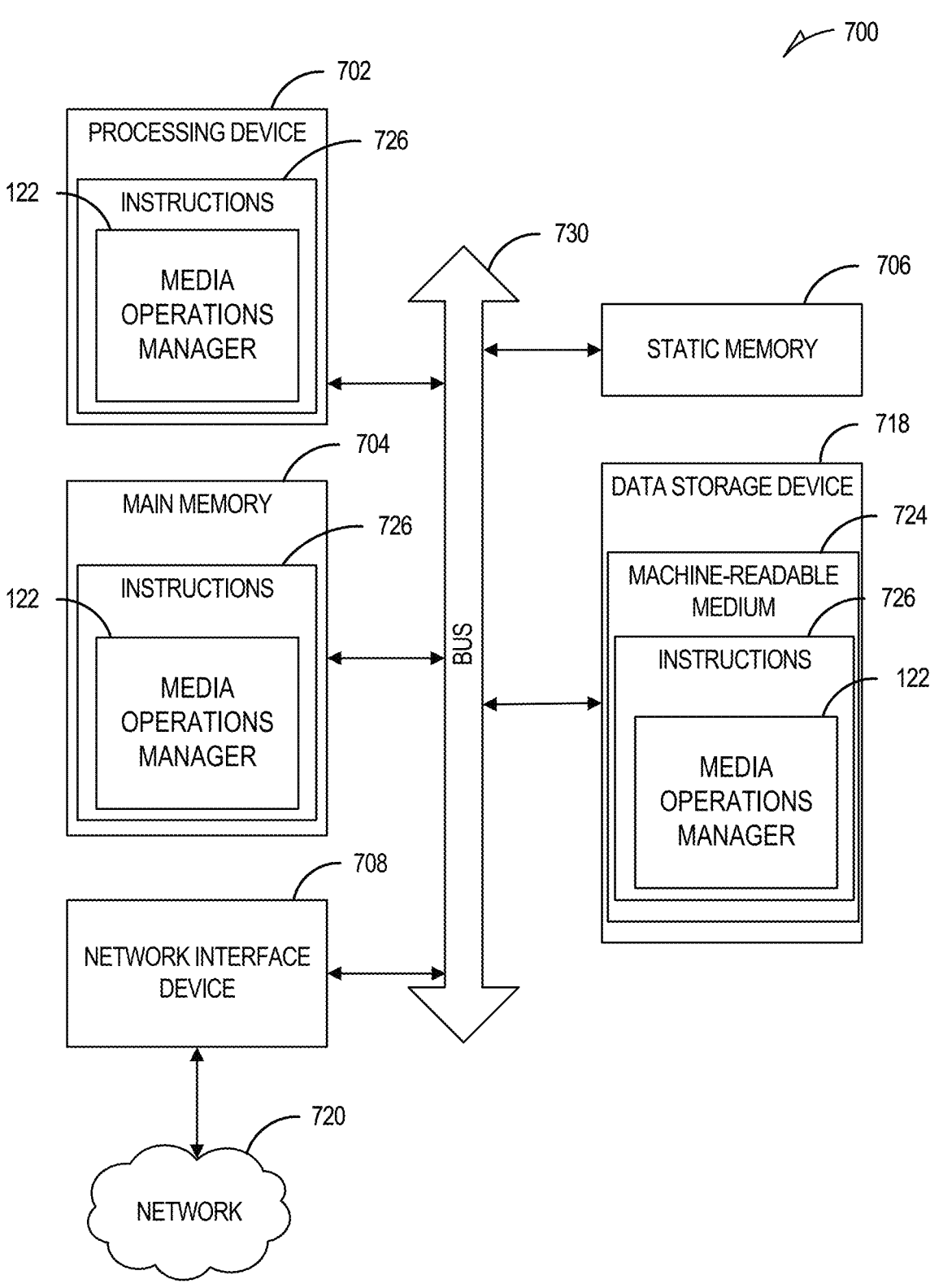
FIG. 7 is a block diagram illustrating a diagrammatic representation of a machine in the form of a computer system within which a set of instructions can be executed for causing the machine to perform any one or more of the methodologies discussed herein, in accordance with some examples.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one example, the instructions 726 implement functionality corresponding to the media operations manager 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, examples of the disclosure have been described. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
   a set of memory components of a memory sub-system; and
   at least one processing device operatively coupled to the set of memory components, the at least one processing device being programmed to perform operations comprising:
   receiving a request to read data from a first portion of the set of memory components;
   identifying a second portion of the set of memory components that has been programmed with data within a threshold period of time of programming the data in the first portion;

retrieving a set of read threshold levels that have been previously used to read the data from the second portion; and reading the data from the first portion using the set of read threshold levels that have been previously used to read the data from the second portion.

2. The system of claim 1, wherein the first portion comprises a first block of an individual memory component and the second portion comprises a second block of the individual memory component.

3. The system of claim 1, the operations comprising:

determining that the second portion is within a threshold physical proximity to the first portion of the set of memory components, wherein the set of read threshold levels is retrieved in response to determining that the second portion is within the threshold physical proximity to the first portion.

4. The system of claim 1, the operations comprising:

receiving a previous request to read the data from the second portion of the set of memory components; and applying a valley track process to compute the set of read threshold levels to read the data from the second portion.

5. The system of claim 4, wherein the valley track process computes the set of read threshold levels by performing operations comprising:

accessing a predetermined read threshold voltage;

sampling data at different read threshold voltages, the different read threshold voltages computed as a function of the predetermined read threshold voltage;

computing an error rate resulting from sampling the data at the different read threshold voltages; and selecting one or more threshold voltages from the different read threshold voltages based on the computed error rate.

6. The system of claim 1, the operations comprising:

storing a table that maps a plurality of portions of the set of memory components to respective sets of read threshold voltages, wherein a first set of portions of the set of memory components comprises a first plurality of portions of the set of memory components that have each been programmed within a first time period, wherein a second set of portions of the set of memory components comprises a second plurality of portions of the set of memory components that have each been programmed within a second time period.

7. The system of claim 6, the operations comprising:

causing a first set of data stored in the first set of portions to be read using a first set of read threshold voltages; and causing a second set of data stored in the second set of portions to be read using with a second set of read threshold voltages.

8. The system of claim 7, the operations comprising:

updating one or more values in the first set of read threshold voltages in response to receiving a request to read data from an individual portion of the first set of portions.

9. The system of claim 7, the operations comprising:

grouping the first set of portions of the set of memory components according to a temperature of the memory sub-system when data was written to each portion of the first set of portions.

10. The system of claim 9, the operations comprising:

causing a first group of the first set of portions to be read using the first set of read threshold voltages, the first group comprising a first subset of the first plurality of portions programmed when the temperature of the memory sub-system was at a first value; and causing a second group of the first set of portions to be read using the second set of read threshold voltages, the second group comprising a second subset of the first plurality of portions programmed when the temperature of the memory sub-system was at a second value.

11. The system of claim 9, the operations comprising:

determining that the temperature of the memory sub-system has shifted from a first temperature range to a second temperature range during programming of data in a first subset of the first plurality of portions; and in response to determining that the temperature of the memory sub-system has shifted from the first temperature range to the second temperature range during programming of the data in the first subset of the first plurality of portions, folding the data into a new portion of the set of memory components.

12. The system of claim 11, the operations comprising:

identifying an individual portion of the plurality of portions in the table that has been programmed within a threshold period of time of when the data has been folded to the new portion; and grouping the new portion with the individual portion in the table.

13. The system of claim 7, the operations comprising:

grouping word lines (WLs) of the first set of portions of the set of memory components into different word line groups (WLGs).

14. The system of claim 13, the operations comprising:

causing data to be read from a first WLG of the different WLGs of the first set of portions of the set of memory components using the first set of read threshold voltages; and causing data to be read from a second WLG of the different WLGs of the first set of portions of the set of memory components using the second set of read threshold voltages.

15. The system of claim 1, the operations comprising:

determining an error rate resulting from reading the data read from the first portion;

determining that the error rate transgresses a threshold; and in response to determining that the error rate transgresses the threshold, updating the set of read threshold levels to re-read the data from the first portion.

16. A method comprising:

receiving a request to read data from a first portion of a set of memory components;

identifying a second portion of the set of memory components that has been programmed with data within a threshold period of time of programming the data in the first portion;

retrieving a set of read threshold levels that have been previously used to read the data from the second portion; and reading the data from the first portion using the set of read threshold levels that have been previously used to read the data from the second portion.

17. The method of claim 16, wherein the first portion comprises a first block of an individual memory component and the second portion comprises a second block of the individual memory component.

18. The method of claim 16, comprising:

determining that the second portion is within a threshold physical proximity to the first portion of the set of memory components, wherein the set of read threshold levels is retrieved in response to determining that the second portion is within the threshold physical proximity to the first portion.

19. The method of claim 16, comprising:

receiving a previous request to read the data from the second portion of the set of memory components; and applying a valley track process to compute the set of read threshold levels to read the data from the second portion.

20. A non-transitory computer-readable storage medium comprising instructions that, when executed by at least one processing device, cause the at least one processing device to perform operations comprising:

receiving a request to read data from a first portion of a set of memory components;

identifying a second portion of the set of memory components that has been programmed with data within a threshold period of time of programming the data in the first portion;

retrieving a set of read threshold levels that have been previously used to read the data from the second portion; and reading the data from the first portion using the set of read threshold levels that have been previously used to read the data from the second portion.

* * * * *